(12) United States Patent
Kim et al.

(10) Patent No.: US 9,375,751 B2
(45) Date of Patent: Jun. 28, 2016

(54) METHOD FOR PREPARING INORGANIC-NANOSTRUCTURE COMPOSITE MATERIAL, METHOD FOR PREPARING CARBON NANOTUBE COMPOSITE USING SAME, AND CARBON NANOTUBE COMPOSITE PREPARED THEREBY

(75) Inventors: Sang-Ouk Kim, Daejeon (KR);
Won-jun Lee, Daejeon (KR);
Duck-hyun Lee, Daejeon (KR); Jin-ah Lee, Daejeon (KR)

(73) Assignee: KAIST (Korea Advanced Institute of Science and Technology), Daejeon (KR)

( * ) Notice: Subject to any disclaimer, the term of this patent is extended or adjusted under 35 U.S.C. 154(b) by 421 days.

(21) Appl. No.: 13/704,611

(22) PCT Filed: Nov. 29, 2011

(86) PCT No.: PCT/KR2011/009157
§ 371 (c)(1),
(2), (4) Date: Dec. 15, 2012

(87) PCT Pub. No.: WO2012/093776
PCT Pub. Date: Jul. 12, 2012

(65) Prior Publication Data
US 2013/0089735 A1 Apr. 11, 2013

(30) Foreign Application Priority Data
Jan. 7, 2011 (KR) .......................... 10-2011-0001727

(51) Int. Cl.
*B05D 1/18* (2006.01)
*B82Y 40/00* (2011.01)
(Continued)

(52) U.S. Cl.
CPC . *B05D 1/18* (2013.01); *B82Y 30/00* (2013.01); *B82Y 40/00* (2013.01); *C01B 31/0226* (2013.01);
(Continued)

(58) Field of Classification Search
CPC .......... B05D 1/18; B05D 3/002; B05D 3/104; B82Y 40/00; B82Y 30/00; C01B 31/0253; Y10T 428/2918; Y10T 428/2991
See application file for complete search history.

(56) References Cited

U.S. PATENT DOCUMENTS

2007/0157348 A1* 7/2007 Bae et al. ........................ 977/742
2009/0208403 A1 8/2009 Hussain et al.
(Continued)

OTHER PUBLICATIONS

Chen, Yougui et al., Enhanced stability of Pt electrocatalysts by nitrogen doping in CNTs for PEM fuel cells, Electrochemistry Communications, 2009, pp. 2071-2076, vol. 11.
(Continued)

Primary Examiner — Kirsten Jolley
(74) Attorney, Agent, or Firm — IP & T Group LLP

(57) ABSTRACT

A method for manufacturing an inorganic-nano structure composite, a method for manufacturing a cabon nanotube composite by using the same, and a carbon nanotube composite manufactured by the same are provided. The method for manufacturing the inorganic-nano structure composite comprises a step of doping pentavalent elements on the nanostructure; and a step of growing the inorganic material from the doping points of the pentavalent elements by dipping the nanostructure on which the pentavalent elements are doped into a precursor solution of the inorganic material, and according to the present invention the pentavalent elements such as nitrogen are doped on the nanostructure and is utilized as the crystallization point of the inorganic material, instead of forming the separate coating layer to the organic-based nanostructure, or binding the binding group to the surface.

13 Claims, 18 Drawing Sheets

(51) Int. Cl.
  C01B 31/02    (2006.01)
  B82Y 30/00    (2011.01)
  B05D 3/10     (2006.01)
  B05D 3/00     (2006.01)

(52) U.S. Cl.
  CPC ............ C01B 31/0253 (2013.01); *B05D 3/002* (2013.01); *B05D 3/104* (2013.01); *Y10T 428/2918* (2015.01); *Y10T 428/2991* (2015.01)

(56) References Cited

U.S. PATENT DOCUMENTS

| | | | |
|---|---|---|---|
| 2010/0041544 A1* | 2/2010 | Hu et al. | 502/101 |
| 2010/0213046 A1* | 8/2010 | Grimes et al. | 204/157.47 |
| 2010/0276644 A1 | 11/2010 | Wolf et al. | |
| 2011/0214723 A1* | 9/2011 | Kang et al. | 136/255 |
| 2012/0252662 A1* | 10/2012 | Assmann | B01J 21/185 502/165 |
| 2012/0267602 A1* | 10/2012 | Kim et al. | 257/9 |
| 2013/0048919 A1* | 2/2013 | Chung et al. | 252/502 |

OTHER PUBLICATIONS

Meng, Xiangbo et al., Heterostructural coaxial nanotubes of CNT@Fe2O3 via atomic layer deposition: effects of surface functionalization and nitrogen-doping.
Journal of Nanoparticle Research, 2011, pp. 1207-1218, vol. 13.
Lee, Hyunju et al., In-Situ Growth of Copper Sulfide Nanocrystals on Multiwalled Carbon Nanotubes and Their Application as Novel Solar Cell and Amperometric Glucose Sensor.
Materials, Nano Letter, 2007, pp. 778-784, vol. 7, No. 3.

* cited by examiner

METHOD FOR PREPARING INORGANIC-NANOSTRUCTURE COMPOSITE MATERIAL, METHOD FOR PREPARING CARBON NANOTUBE COMPOSITE USING SAME, AND CARBON NANOTUBE COMPOSITE PREPARED THEREBY

This application is a national stage application of PCT/KR2011/009157 filed on Nov. 29, 2011, which claims priority of Korean patent application number 10-2011-0001727 filed on Jan. 7, 2011. The disclosure of each of the foregoing applications is incorporated herein by reference in its entirety.

TECHNICAL FIELD

The present invention relates to a method for manufacturing an inorganic-nano structure composite, a method for manufacturing a carbon nanotube complex, and a carbon nanotube complex manufactured by this, and more specifically relates to a method for manufacturing an inorganic-nano structure composite wherein the inorganic material can be effectively coated and bound to the nanostructure by doping the nanostructure with pentavalent elements, a method for manufacturing a carbon nanotube complex and a carbon nanotube complex manufactured by this.

BACKGROUND ART

A nanostructure means the microstructure having a nanoscale, and the application scope thereof is increasingly broadened depending on the demand of the micro technology. One of these nanostructures is a carbon nanostructure based on carbon, and the carbon nanotube (CNT) which is one of the carbon nanostructures is a carbon allotrope that is present in a larger amount on the earth, and the material having a tube shape that one carbon atom is bonded to another carbon atom in a hexagonal honeycomb pattern, i.e., the material that the carbon has a graphite structure wherein the carbon forms the hexagonal shape, and it is the material that the diameter of the tube is extremely small to the nanometer level, and this represents sp2 hybridization. However, the carbon nanostructure such as the carbon nanotube has been used together with an acidic mixture or used as a complex form bonded to various polymeric material, due to its broad surface area and also a low chemical reactivity of carbon. But, in the case of the inorganic material such as a metal, it exhibits a low binding property with the carbon nanostructure which is a typical organic material, and thus, in order to solve such problem, a method for coating a separate binding layer on the carbon nanostructure is needed.

DISCLOSURE

Technical Problem

Therefore, the problem to be solved by the present invention resides in providing the method for manufacturing an inorganic-nanostructure composite wherein the inorganic material can be effectively bonded and coated to the nanostructure, and the inorganic-nanostructure complex manufactured by this.

Another problem to be solved by the present invention is to provide the method for manufacturing the carbon nanostructure complex in an economical manner, wherein the inorganic material can be effectively coated on the carbon nanostructure, and the inorganic-nanostructure complex manufactured by this.

Means for Solving the Problem

In order to solve the problems, the present invention provides the method for manufacturing an inorganic-nanostructure composite, characterized by comprising the step of: doping pentavalent elements to a nanostructure and then forming doping points; and growing an inorganic material from the doping points of the nanostructure by dipping the nanostructure having the doping points into a precursor solution of the inorganic material to be grown.

In one example of the present invention, the nanostructure includes the hexagonal graphite structure as the carbon nanostructure, and wherein the doped pentavalent elements are substituted for carbon atoms of the graphite structure.

In one example of the present invention, the carbon nanostructure is any one being selected from the group consisting of a carbon nanotube, carbon nanowire and graphine, the step for growing the inorganic material is proceeded in such a manner that the nanostructure is immersed into the precursor solution without any separate heating process, and then, such immersing state is maintained for the predetermined time.

In one example of the present invention, the inorganic material is any one selected from the group consisting of the metal, the metal oxide and the biomineral, and the biomineral is selected from the group consisting of silica, calcium carbonate, AU, titanium oxide, ruthenium oxide, zinc oxide, manganese dioxide, Ag, Pt and molybdenum oxide.

The present invention further provides the inorganic-nanostructure composite material manufactured by the method mentioned above.

In order to resolve the another problem, the present invention provides the method for manufacturing the carbon nanotube composite, the method comprising a step of doping pentavalent elements to the carbon nanotube; and a step of coating the doped carbon nanotube with an inorganic material, wherein the step of coating the inorganic material is progressed in such a manner that the carbon nanotube on which the pentavalent elements are doped is dipped into a solution containing the inorganic material to be coated, and then maintained for the predetermined times.

In one example of the present invention, the carbon nanotube is plural number growing vertically from the substrate, and the method further comprises the step hydrophilic-treating the carbon nanotube so that the solution comprising the inorganic material is sufficiently penetrated between the plural carbon nanotubes before the coating step, wherein the hydrophilic-treating step is proceeded in such a manner that the carbon nanotubes are immersed into the hydrophilic solution.

In one example of the present invention, the substrate is vapor deposited by a catalyst selected from the group consisting of Fe, Ni and Cu, and the carbon nanotube is vertically grown by the method selected from the group consisting of plasma enhanced chemical vapor deposition, sputtering and graphilizing of the polymer. In addition, the inorganic material is any one selected from the group consisting of the metal, metal oxide and biomineral, in which the biomineral is selected from the group consisting of silica, calcium carbonate, Au, titanium oxide, ruthenium oxide, zinc oxide, manganese dioxide, Ag, Pt and molybdenum oxide.

The present invention provides the carbon nanotube composite manufactured by the method mentioned above. The present invention also provides the carbon nanostructure the surface of which is coated by the inorganic material, that is, the carbon nanostructure the surface of which is coated by the inorganic material is characterized in that the pentavalent elements are doped on the carbon nanostructure, and the coated inorganic material is crystallized from a point of the carbon nanostructure doped with the pentavalent elements.

Advantageous Effects

In accordance with the embodiments of the present invention, the nanostructure is doped by the pentavalent elements such as nitrogen, and utilized as the point for crystallizing the inorganic material, instead of that the separate coating layer is formed on the nanostructure based on the organic material, or a bonding group is bonded to the surface of the nanostructure. Therefore, the bonding property between the nanostructure and the inorganic material can be increased in an economical and effective manner, and the inorganic-nanostructure in which the inorganic material and nanostructure are chemically bonded can be manufactured. Further, the carbon nanostructure according to the present invention is greatly improved in a conductivity and chemical reaction property, due to the inorganic material chemically bonded to the surface of the structure, when comparing with the conventional carbon nanostructure, especially, in accordance with one example of the present invention, nitrogen-doping Carbon NanoTube (NCNT) vertical array coated with the biomineral is useful for studying the synthesis of the bio inorganic material related to a biomimetic research.

BEST MODE FOR THE INVENTION

Unless defined otherwise, all the technical and scientific terms used in the present specification have the same meanings as those commonly understood by a person skilled in the art to which the present invention subjects. Generally, a nomenclature used in the present specification and an experiment methods described below are those well-known in the present technical fields and conventionally used.

The present invention replaced the constitutive elements of the nanostructure with the pentavalent elements by doping the pentavalent elements on the nanostructure itself, instead of binding the separate functional group to the nanostructure itself, or coating the binding layer, in which the pentavalent elements are atoms having five outermost electrons, and its representative example is nitrogen. Especially, the elements on the surface of the nanostructure are substituted with the pentavalent elements at the doping points, and the inorganic materials are nucleated and crystallized from the points of the substituted pentavalent elements. In the present invention, the nanostructure is a structure having a nanoscale, and specifically means the organic nanostructure based on the organic material. As one example thereof, the carbon nanostructure, such as the carbon nanotube, carbon nanowire, graphene, etc. can be used as the nanostructure, and the carbon nanostructure having the graphite structure in which six carbons form the hexagon structure can be used as the nanostructure. The pentavalent elements, nitrogen atoms used in one example of the present invention is substituted for any one or more of carbons forming the hexagon structure by doping, the substituted nitrogen becomes a pyridinic or quarternary form due to the property of the graphite structure, and the nitrogen provides the position for the chemical binding between the inorganic material and the organic-based nanostructure, as an active point for the reaction.

MODE FOR CARRYING OUT THE INVENTION

Figure 1:
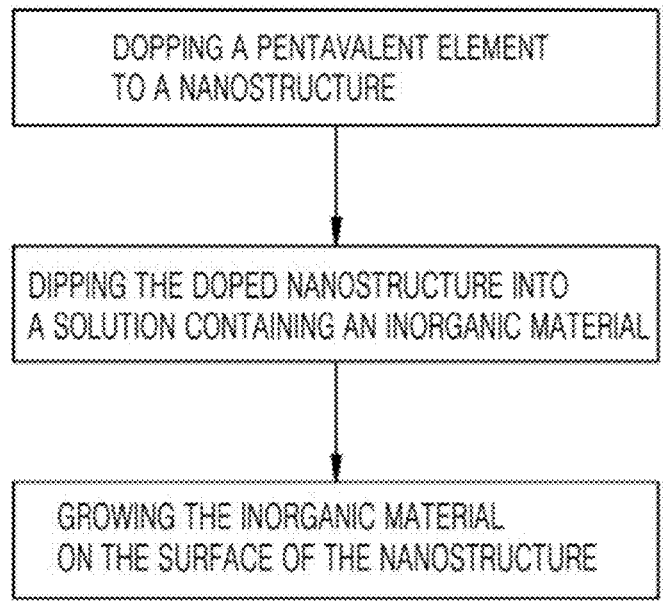
FIG. 1 is a diagram showing a method for manufacturing the inorganic-nanostructure composite in accordance with one example of the present invention.

FIG. 1 is a flow chart showing a method for manufacturing an inorganic-nanostructure composite material according to one example of the present invention. Wherein the inorganic-nanostructure composite means the substance materials in which the inorganic material is bound to the nanostructure, more specifically means the composite having a form that the inorganic material coats the organic nanostructure.

Referring to FIG. 1, at first, the pentavalent elements are doped to the nanostructure. The doping of the pentavalent elements can be performed by various modes conventionally used in the relevant art, for example, the pentavalent elements can be doped by a sputtering process, etc. Since the doped pentavalent elements facilitate the following binding between the inorganic material and the nanostructure, the present invention can control a rate of the surface coating, the coating thickness, etc. for the inorganic material depending on the doping amount of the pentavalent elements.

Then, the nanostructure in which the pentavalent elements are doped is immersed into the solution comprising the inorganic material to be coated. The solution comprising the inorganic material can comprise the inorganic material itself, whereas the solution can be the precursor solution in which the desired inorganic material layer can be formed on the surface of nanostructure according to the reaction with the pentavalent elements. The inorganic material is growing from the doping points of the pentavalent elements depending on the immersion into the solution.

In one example of the present invention, the nanostructure is the organic nanostructure such as a carbon nanostructure, the carbon nanostructure comprises the graphite structure in which six carbons form hexagon. Therefore, the pentavalent elements which are doped by a foreign physical force is injected into the nanostructure while breaking the hexagon structure, and thus, the pentavalent elements become the active site of the chemical reaction progressing after the doping. Wherein the carbon nanostructure comprising the graphite structure can be the carbon nanotube, carbon nanowire or graphene, but the scope of the present invention is not limited to that.

In addition, the inorganic material to be coated on the nanostructure can be the metal, metal oxide or biomineral. Wherein the biomineral commonly refers to the inorganic material which can be vapor deposited by the biomineralization, i.e., the natural self-assembling method in which the inorganic material is crystallized on the organic matrix of micro- or nanoscale as the inorganic material and then, is vapor deposited thereon, and the conventional metal, metal oxide and the biomineral which can be naturally self-assembled are referred to separately with each other in the present invention, but, some of the biominerals can be included in the metal or metal oxide. The biomineral is reported as being about ten kinds until now, and the biomineralization for obtaining such biominerals can be occurred on the natural state, i.e., the ambient pressure, room temperature or below, around to the neutral pH, aqueous basic solution. The biomineralization mechanism thereof is considered as the interesting alternative for the gaseous vapor deposition, because the aqueous basic solution is advantageous in that it is more inexpensive, and exhibits a faster vapor deposition velocity and a low energy consumption rate, when comparing it with the gaseous vapor deposition method. However, it has been only partially used in manufacturing the composite, since there is a limitation on the kinds of the material which can be used as a casting material in the biomineralization. That is, a functionality of the casting material is an essential requisite in forming the bioinorganic (biomineral), and thus it is very important to manufacture the effective casting material. However, the kinds of the organic matrix which the biomineral can be vapor deposited under a liquid state are extremely limited due to the problems such as the weak thermal stability, deterioration of durability, etc. However, the present invention effectively vapor-deposits the biomineral in liquid state to the nanostructure, by using the doped carbon nanostructure as the casting material in such biomineralization.

The biomineral in the present invention can be any one being selected from the group consisting of silica, calcium carbonate, Au, titanium oxide, ruthenium oxide, zinc oxide, manganese dioxide, Ag, Pt and molybdenum oxide, but the kinds of the inorganic materials in which the pentavalent elements are bound to the doped nanostructure in the present invention are not limited into the examples. In addition, the nanostructure in the present invention is the carbon nanostructure comprising the hexagonal graphite structure, and in one example of the present invention the carbon nanotube composite on which the inorganic material is coated, is manufactured by using the carbon nanotube of carbon nanostructures.

Figure 2:
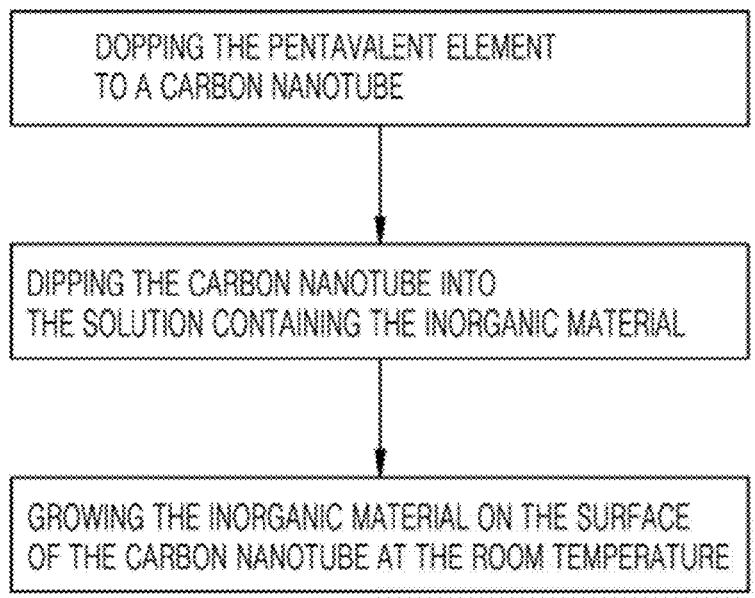
FIG. 2 is a diagram showing a method for manufacturing the carbon nanotube composite coated with the inorganic material in accordance with one example of the present invention.
Figure 3A:
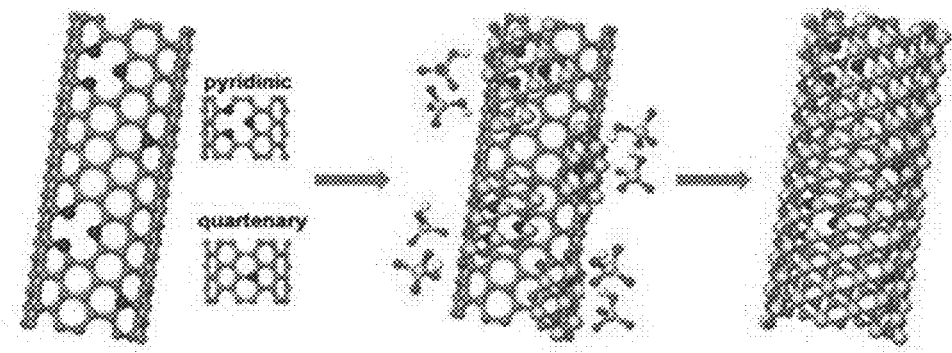
FIG. 3, (a) is a mimetic diagram representing the biomineralization process forming the biomineral through the structure of Nitrogen-doping Carbon NanoTube (NCNT) and the amine precursor in accordance with one example of the present invention. (b)-(e) are photographs representing the analysis result of Scanning Electron Microscope (SEM) and Transmission Electron Microscope (TEM) [(b): SEM image of NCNT, (c): TEM image of NCNT, (d): SEM and TEM photos of NCNT coated with silicon oxide, (e): SEM and TEM photos coated with calcium carbonate].
Figure 3B:
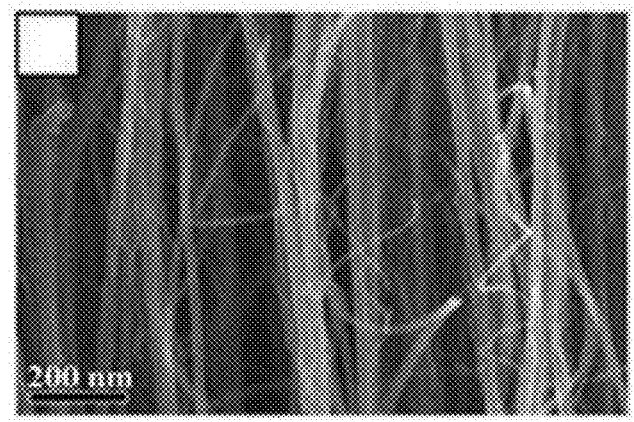
Figure 3C:
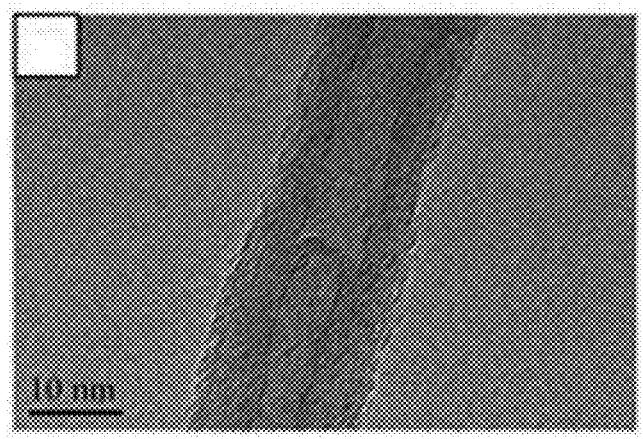
Figure 3D:
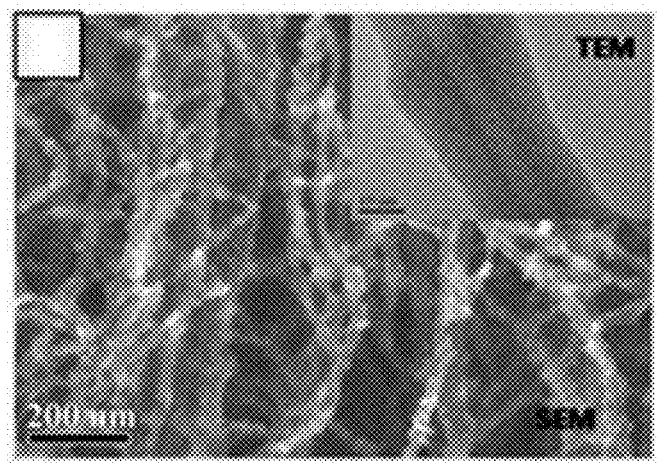

FIG. 2 is a flow chart showing a method for manufacturing the carbon nanotube composite on which the inorganic material according to one example of the present invention is coated. Referring to FIG. 2, the pentavalent elements are firstly doped to the carbon nanotube. The doped pentavalent elements are substituted for some of carbons on the surface of the carbon nanotube, and provides the position for the nucleation in the crystallization of the inorganic material. Consequently, the carbon nanotube in which the pentavalent elements are doped is coated with the inorganic material, and in this case the coating of the inorganic material is proceed with so called immersion manner in which the carbon nanotube in which the pentavalent elements are doped is immersed into the solution comprising the inorganic material to be coated. The present invention especially maintains the temperature as the room temperature, in such immersion process, and thus, is possible to manufacture the composite economically.

In the Working examples explained below the carbon nanotube is the plural number which is vertically grown from the substrate, and the carbon nanotube is hydrophilic-treated so that the solution comprising the inorganic material can sufficiently penetrate through the plural number of carbon nanotubes before the coating step. The pretreatment of the carbon nanotube is progressed in such a manner that the carbon nanotube is immersed into the hydrophilic solution such as ethanol in one example of the present invention. In addition, the vertical growth of the carbon nanotube can be made by the plasma enhanced chemical vapor deposition method, sputtering method and graphitization of the polymer on the substrate that is vapor-deposited by the catalyst selected from the group consisting of Fe, Ni and Cu. Optional all kinds of inorganic materials that can react with the pentavalent elements doped on the nanostructure, in the solution state and then can be crystallized as described above belong to the inorganic material of the present invention.

In one example of the present invention, the inorganic material is coated on the carbon nanotube in such a manner that the carbon nanotube in which the nitrogen is doped is immersed into the solution comprising the inorganic material, at this time, it could be verified that nitrogen doped on the carbon nanotube can be utilized as the position for the binding and nucleation, and thus it can be verified in one example of the present invention that the method for manufacturing the inorganic-nanostructure composite can be applied for the biomineralization, and in this case, if the carbon nanotube on which nitrogen is doped is used as the organic matrix, the new and useful method can be presented in the synthesis of the composite such as the bioinorganic membrane.

One example of the present invention relates to the method for manufacturing the carbon nanotube composite on which the inorganic material is coated, which comprises steps of: (a) manufacturing NCNT vertical array by growing NCNT on the substrate in the vertical direction; (b) manufacturing NCNT on which the biomineral is coated by immersing the NCNT vertical array into the immersion solution comprising the biomineral; (c) washing the NCNT vertical array on which the biomineral is coated; and (d) removing the remaining moisture from the washed NCNT vertical array on which the biomineral is coated, and the carbon nanotube composite manufactured by such method, wherein the biomineral is used as the inorganic material, but the scope of the present invention is not limited to that.

In the example of the present invention, the substrate can use Si, $SiO_2$, $Si/SiO_2$, Indium Tin Oxide (ITO) and Fluoride doped Tin Oxide (FTO), and preferably can use $SiO_2$. In the case of $SiO_2$ substrate, it can be used by lifting on the CNT mat manufactured by using HF, etc. and the other substrate manufactured based on the materials such as ITO, FTO and flexible plastic, etc after separating the substrate and, can preferably used in the present invention. In the present invention, the substrate is coated with thin-film Fe catalyst by electron beam evaporation using an electron beam. The evaporation using the electron beam is the method for evaporating the material to be evaporated on the substrate by evaporating it with the heat occurred by colliding the heat electrons emitted from the filament by applying very high voltage with the evaporation source, and since it uses a water-cooling pot under high vacuum ($10^{-5}$ torr or less), the contamination which is a drawback of the resistance-heating type is relative low, and since it accesses the heat electron having high energy, it can evaporate even by using the high melting point material, and since it is easy to control the evaporation velocity, recently, it is the method widely used recently.

The carbon nanotube which is the nanostructure used in experiments of the present invention is Nitrogen doping Carbon NanoTube (NCNT) on which Nitrogen is doped, the present invention is based on the fact that NCNT has the unique feature improving a hardness, electric conductivity and chemical reactivity without lowering other physical properties of CNT. In addition, the inventors of the present invention used several methods comprising the sputtering, graphitization of the polymer, CVD growth using $NH_2$ gas at the high temperature as the method for growing NCNT on the substrate in the vertical direction, and in the case of the sputtering or graphitization of the polymer among them, this has drawbacks that the vertical array is not possible immediately after the synthesis and is possible by only two steps by using an external field. In addition, although the thermal CVD method can be used in the vertical growth of NCNT, since the force of the external field is weaker than in the PECVD method, it has the drawback that the length and straightness of the CNT grown vertically is decreased. In the case of CVD which is synthesized by the heat CVD method, it can be used for the case that the short CNT application is needed. The plasma enhanced chemical vapor deposition (PECVD) which is a CVD growing method using $NH_3$ gas especially at the high temperature among the above methods has an advantage which can synthesize the vertical array of NCNT in which an increase of the chemical reactivity and an enlargement of the surface area are verified, and thus, can be preferably used in the present invention.

In the present invention, the PECVD is performed by heating to 750° C. under the atmosphere flowing a mixture of hydrogen and ammonia gas. At this time, the mixed gas is flowed at the pressure of 0.2~0.6 torr. Ammonia is included in the range of 20~40 vol % in the mixed gas, and the total flow rate to the ambient gases is reinforced so as to make the catalyst particle as an isotropic shape. The pressure of a chamber is increased to 4.5 torr, DC plasma is activated together with anionic DC voltage of 540V related to the bottom substrate. Then, the plural number of the carbon nanotube arrays vertically grown from the catalyst array can be manufactured by slowly flowing hydrogen carbonate gas at the flow rate of 3~7 sccm for 30 sec~90 sec.

In the present invention, since the NCNT vertical array comprises quadrivalent amine and pyridinic amine in the structure by Nitrogen doping, it can be used as a good template, in coating the inorganic material such as the biomineralization. In particular, the surface doping pentavalent elements become the position for evaporating the inorganic material and also provides the lower surface energy, together with the improvement of the wettability. Therefore, the general inorganic materials such as a silica and calcium carbonate can be evaporated on the surface of NCNT vertical array having the elaborate layered structure by the surface doping pentavalent elements, and thus, the nano-hybrid substances can be easily and quickly manufactured together with the good casting and can be applied to the evaporation of other inorganic materials.

Figure 4A:
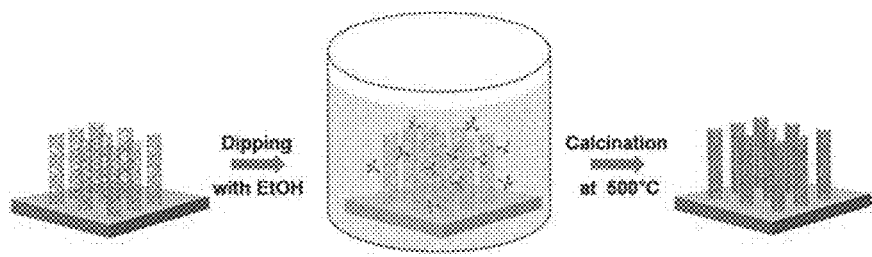
FIG. 4, (a) is a mimetic diagram depicting the biomineralization procedure in accordance with one example. (b)-(e) are photos representing analysis results of SEM and TEM [(b): a SEM image of a cross section of NCNT vertical array, (c): a plane SEM image of NCNT vertical array, (d): a SEM image of NCNT vertical array coated with silicon oxide, (e): a SEM image of NCNT vertical array coated with calcium carbonate].
Figure 4B:
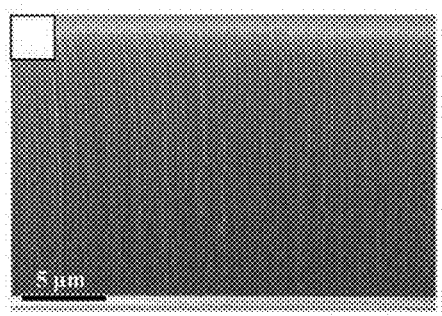
Figure 4C:
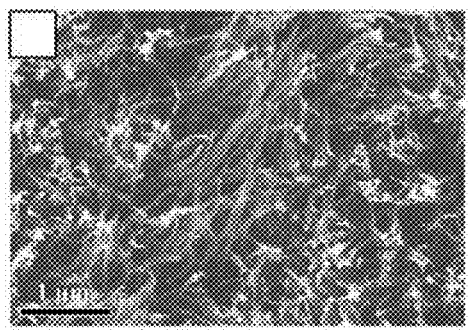
Figure 4D:
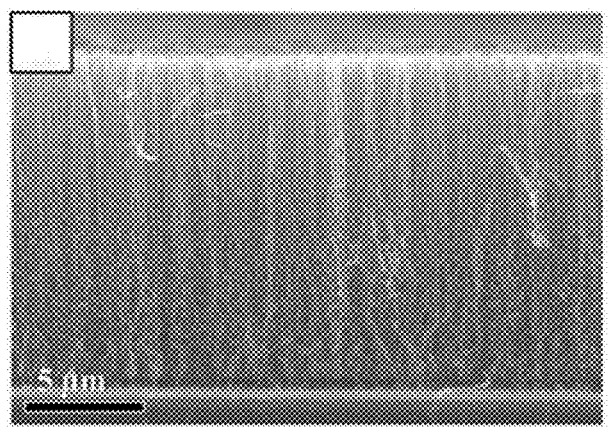
Figure 4E:
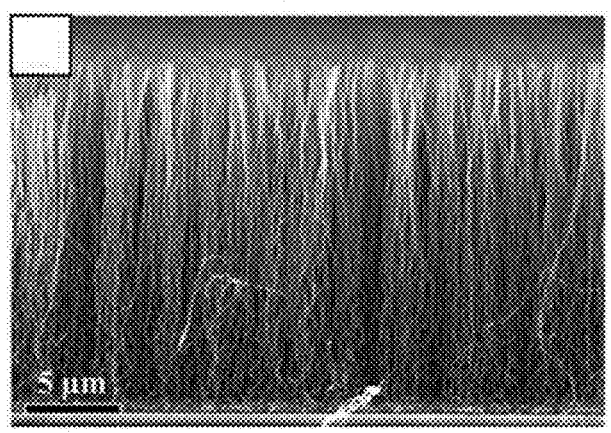
Figure 5A:
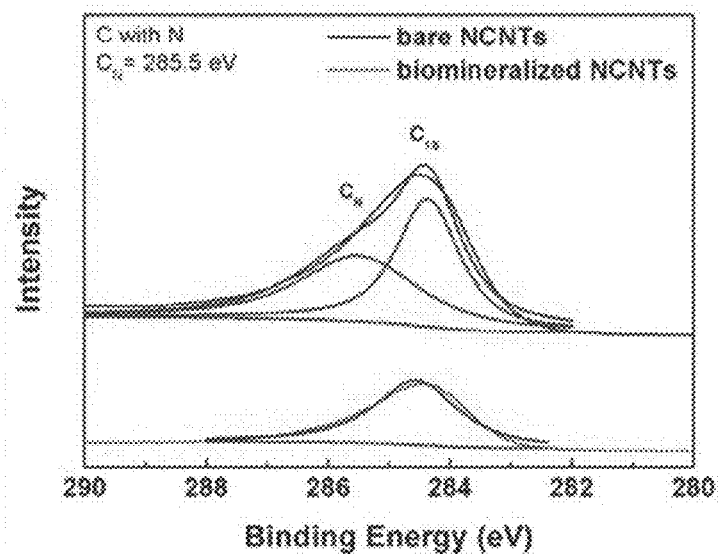
FIG. 5 is graphs representing X-ray photoelectron spectroscopy (XPS) test results changed after the biomineralization procedure in accordance with one example [(a): a carbon peak when both N and $C_{1s}$ are present altogether, (b): a nitrogen peak when pyridinic nitrogen ($N_p$), tetravalent Nitrogen ($N_Q$) and Nitrogen oxide ($N_{ox}$) are present altogether, (c): Silicon peak ($Si_{2p}$), (d): Calcium peak ($Ca_{2p}$)].
Figure 5B:
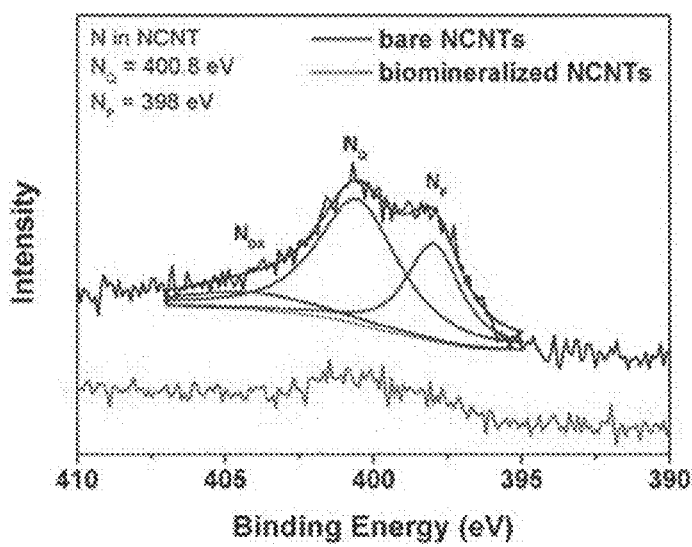
Figure 5C:
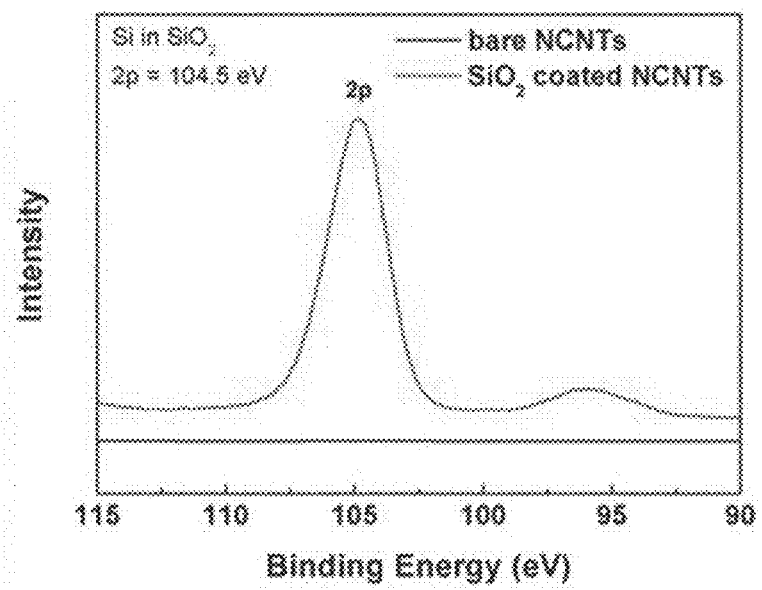
Figure 5D:
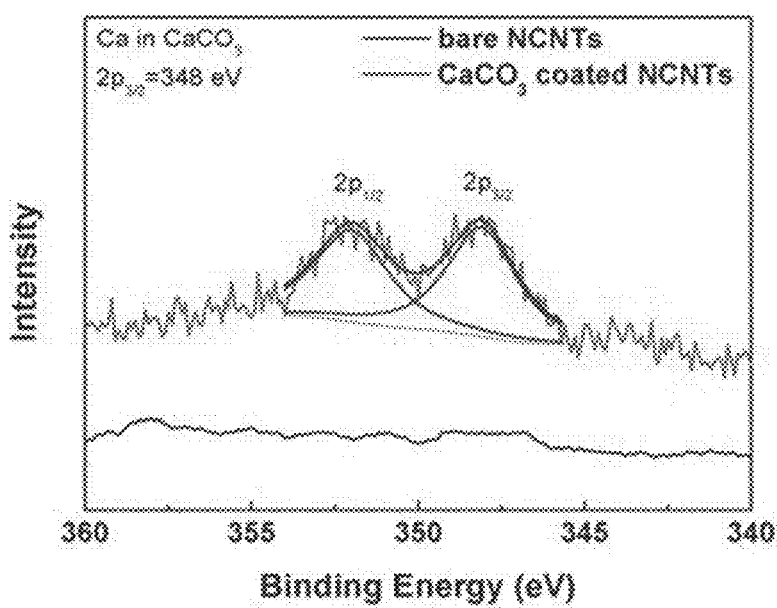

Referring to FIG. 3, (a), it can be seen that the composite carbon nanostructure in which the inorganic material such as the metal, metal oxide, or biomineral is coated on the carbon nanostructure on which the pentavalent elements are doped can be obtained according to the present invention. The coating of inorganic material used in the one example of the present invention is performed in the simple dip-coating manner, by using the dip solution comprising the inorganic material such as biomineral at pH 6~8.5. NCNT vertical array is firstly dipped into the aqueous hydrophilic solution before the dipping process, if it is not dipped into the aqueous hydrophilic solution such as ethanol, it is difficult to penetrate the solution comprising the inorganic material up to the depth of 20 μm used in the present experiment, and the phenomenon that the penetration is stopped at around 10 μm is observed. However, in case of the vertical growth NCNT of 10 μm or less, it could be observed that the biomineral is coated even though the hydrophilic solvent is not used. Also, the aqueous solution used in the dip coating process has the advantage that it can make the capillary and tension making that NCNT vertical array is not collapsed. The process that the mineral material is coated via the structure of NCNT and amine precursor is represented as the mimetic diagram in FIG. 3(a), and the schematic view of the method of manufacturing the inorganic-nanostructure according to the present invention is represented in FIG. 4(a).

In the present invention, when NCNT being pentavalent element nanostructure is coated with the silica being the biomineral, a particular type of NCNT composite that is silica-coated with FE-SEM and HR-TEM can be observed. When small piece of silica-coated NCNT is produced while the sample is disrupted during the performing procedures of FE-SEM experiment, it can be seen that NCNT is covered with the aggregate of the silica particles. Upon carefully observing the shape by using HR-TEM, it can be seen that the inner surface of NCNT is covered with the silica film and the thickness of the silica film is 4±1 nm. Through this, it represents the matter that the silica film is very thinly contacted with NCNT during the silica coating procedure and, the fact that it has a good adhesive force. However, in case of CNT coating, the feature that the silica is partially vapor-deposited in the case of original CNT is observed, above results prove that there is a particular interaction between the silica and NCNT. Also, FIG. 5 is the research results of the spectrum of the inorganic material (silica) coating NCNT composite, compared to the NCNT vertical array casting by x-ray photoelectron spectroscopy (XPS). In order to study the reason that the formation of the inorganic material coating over NCNT is possible, carbon and nitrogen are used for the study of the structure and chemical composition of NCNT. NCNT vertical array casting exhibits very strong nitrogen together with carbon peak (285.5 eV) in the Carbon XPS spectrum. But, $C_N$ peak is disappeared and $C_{1S}$ peak strength is also decreased after the inorganic material coating process (FIG. 5, (a)). Based on Carbon XPS results, it can be seen that a special interaction between CNT position on which Nitrogen is doped and the inorganic material can be occurred. In order to understand the specific mechanism, the study is additionally progressed through Nitrogen XPS. When Nitrogen substituent having enriched electrons is replaced with carbon on the graphite layer, four types could observe XPS peak (pyridinic ($N_P$), pyrrolic Nitrogen ($N_{PYR}$), tetravalent Nitrogen ($N_Q$), Nitrogen Oxide ($N_{OX}$)). Non-helical Nitrogen XPS exhibits the spectrum of pyridinic Nitrogen (398ev), tetravalent Nitrogen (400.8 eV), Nitrogen oxide (402~406 eV). The peak (399 eV) for the pyrolic nitrogen is masked by $N_P$ and $N_Q$. NCNT array on which the inorganic material is coated after manufacturing the composite exhibits only one peak for $N_{PYR}$ (FIG. 5, (b)). According to above results, it can be considered that $N_P$ and $N_Q$ which is more relevant to the inorganic material coating provides the position for the initial nucleation which is important in forming the inorganic coating thin-film. Such fact can be the important core principle for the phenomenon in which the inorganic material is coated on the pentavalent element-doping carbon nanostructure. The mechanism for forming the film of silica and calcium carbonate which are the inorganic materials used in the examples of the present invention is not known. But, it is considered that the amino group plays a role as the position of the nucleation for the reaction of silica and calcium carbonate. In addition, it is reported that $Si_{2P}$ peak of Silicon on the silica increases to about 103.5 eV. As shown in FIG. 5, (c), it can be seen that the peak exhibited at 104 eV is caused from the silica coated on NCNT. In the case of NCNT on which calcium carbonate is coated, two kinds of Calcium peak are exhibited in the zone of 347348 eV, and this is consistent with the results previously reported (FIG. 5, (d)).

In the present invention, the washing of the (c) step used the tertiary distilled water, upon washing, the manner such as spraying the distilled water on the object coated ten times or more or dipping the object coated into the distilled water, etc. is used, and the time required for washing is not limited. Since the solution comprising the inorganic material used in experiments of the present invention has a high solubility in water, the inorganic materials which are not bound to NCNT chain can be dissolved in water during the washing step and then can be removal. In the present invention, the removal of the remaining moisture in the (d) step is characterized in that it is performed at 450~550° C. for 20~40 min. Thus, NCNT vertical array on which the inorganic material is coated can be maintained as a large-area (1 cm×1 cm) and utilized through the rapid evaporating of the remaining solution at high temperature under high vacuum.

Hereinafter, the present invention will be described in more detail through the following examples. These examples are to explain the present invention more specifically, and it will be apparent to those having ordinary knowledge in the art that the scope of the present invention is not limited to these examples.

EXAMPLE 1

The Manufacture of Silica-Nanostructure Composite

EXAMPLE 1-1

The Manufacture of Pentavalent Element Doping Nanostructure

In the present example, carbon nanotube is used as the nanostructure, and especially pentavalent elements, Nitrogen doping Carbon NanoTube (NCNT) array, is used as the carbon nanostructure, after vertically growing up on the substrate. The growth of NCNT in the present example is performed on silicon oxide substrate on which Fe catalyst is vapor-deposited by PECVD method. Silicon oxide substrate is heated at 750° C. under the atmosphere flowing the mixed gas of hydrogen and ammonia gas (Ammonia: 40 sccm, Hydrogen: 60 sccm, Acetylene: 5 sccm or Ammonia: 20 sccm Hydrogen: 80 sccm, Acetylene: 5 sccm), and at this time the pressure of the mixed gas is maintained at 0.4 torr. The temperature of the heated substrate is descended slowly for the period of 3 minutes or less. After increasing the pressure of the chamber to 4.5 torr, DC plasma is activated by adding the Direct Current (DC) voltage of 540V to the ground connection substrate. The dense vertical NCNT array grown from the catalyst array is manufactured by flowing Acetylene source gas at the flow rate of 5 standard cubic centimeter per minute (sccm) for 1 min.

Figure 6:
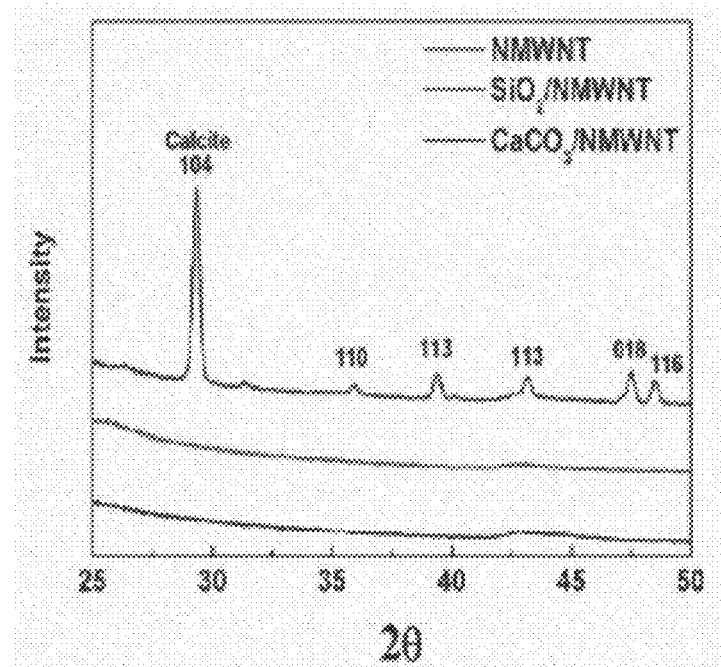
FIG. 6 is X-ray diffraction (XRD) analysis result of NCNT according to one example, NCNT coated with Silicon oxide and, NCNT coated with calcium carbonate.
Figure 7A:
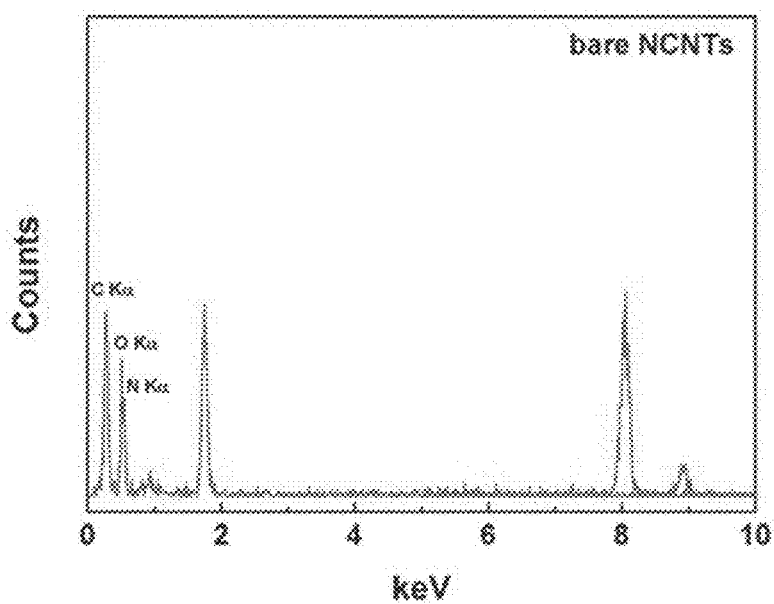
FIG. 7 is Energy-Dispersive spectroscopy (EDX) analysis result of NCNT according to one example, NCNT coated with silicon oxide and, NCNT coated with calcium carbonate.
Figure 7B:
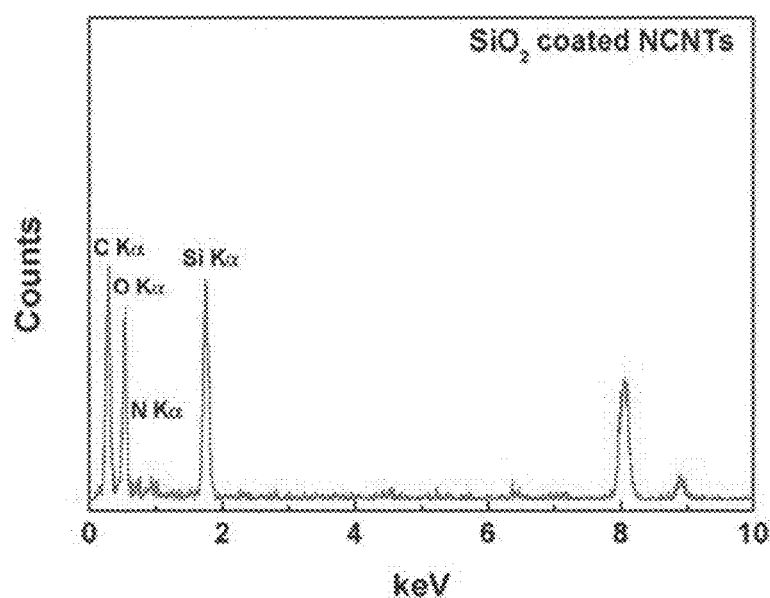
Figure 7C:
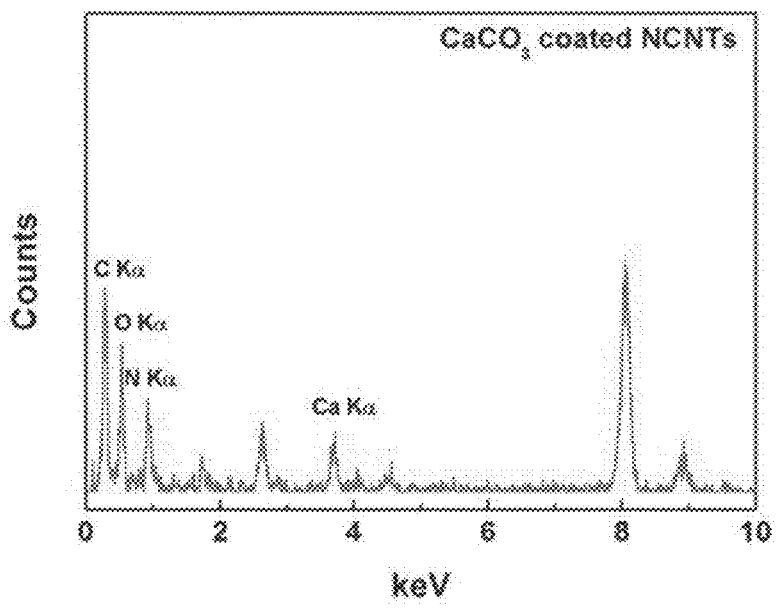

As a result of indentifying Environmental Scanning Electron Microscope (E-SEM) and High-Resolution Transmission Electron Microscopy (HR-TEM), it could be noticed that NCNT is manufactured successfully. (FIG. 3, (b) and (c)) In FIG. 3, (c), NCNT exhibited the structure like a bamboo as shown in other Nitrogen doping CNT. Wherein, it is suggested the fact that the presence of Nitrogen is the important requirement in forming the bamboo type structure of NCNT. In addition, the presence of Nitrogen in NCNT has been identified by Energy-Dispersive Spectroscopy (EDX). (FIG. 7) When determining the length of NCNT and the dispersion of a diameter, it is shown that the length of NCNT is about 10~20 μm, and the diameter is 15~20 nm. In FIG. 5, (a) and (b), XPS test results for NCNT vertical array is graphically represented, abd in FIG. 6, XRD analysis result is graphically represented.

EXAMPLE 1-2

Inorganic Material Coating

Pentavalent element doping Carbon NanoTube, NCNT vertical array, as made in example 1-1 is soaked in the hydrophilic solvent, ethanol for one minute and then took out it. The penetration effect of the inorganic material is improved by such, this is the same as stated above. Afterward, it is immersed to the immersion solution comprising silica (the solution containing the inorganic material) at the room temperature for four hours, and then is washed with the distillation water. The immersion solution comprising the above silica is manufactured by mixing 60 mg of Sodium silicate solution (26.5 wt % $SiO_2$, Sigma Aldrich) and Tris.HCl buffer (6 ml, 0.5M) in the present example.

Figure 8A:
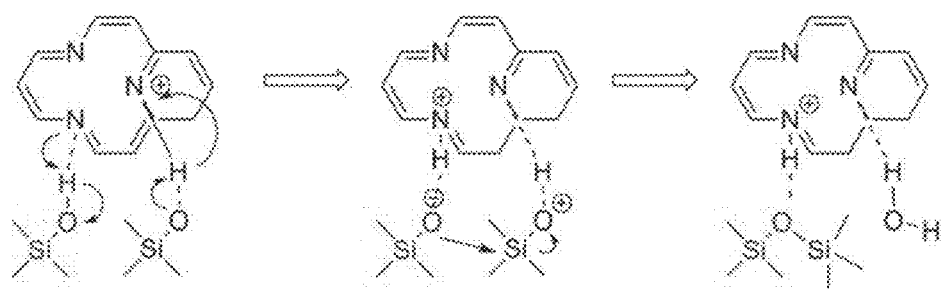
FIG. 8, (a) is a mechanism forming NCNT coated with silicon oxide according to one example, and (b) is a mechanism forming NCNT coated with calcium carbonate according to one example.
Figure 8B:
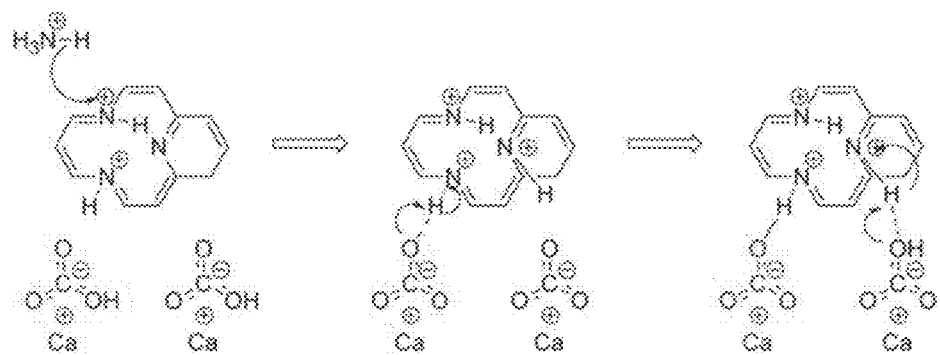

In FIG. 3, (d) depicted SEM and TEM photos for NCNT vertical array on which Silica is coated, FIG. 4, (d) depicted SEM image for NCNT vertical array on which silica is coated. The XRD pattern for NCNT on which silica is coated is depicted on FIG. 4, since silica is present as amorphous form, the diffraction peak is not observed. A broad peak at 43' is emerged by (103) of the graphitization of CNT. The EDX analysis result of NCNT vertical array on which silica is coated is depicted on FIG. 5, and the mechanism forming NCNT vertical array on which silica is coated is depicted in FIG. 8, (a).

EXAMPLE 1-3

Dry and Plasticity

After putting the NCNT vertical array on which silica is coated according to example 1-2 calcining furnace (KeSeong Scientific Co., Tube Furnace), it is plasticized at 500° C. for 30 minutes to remove moisture and then, the carbon nano composite, NCNT vertical array on which the inorganic material silica is coated, is manufactured with maintaining its vertical structure.

EXAMPLE 2

The Manufacture of Calcium Carbonate-Nanostructure Composite

The carbon nanotube composite is manufactured as the same method as in Example 1, except that calcium carbonate is used as the inorganic material.

In the present example, carbon dioxide gas is bubbled into Mili-Q desalted water in the presence of calcium carbonate (Aldrich) for 4 hours, the excess amount of solid calcium carbonate is removed through the filter, the filtrate is mixed with 3 mL of a supersaturated calcium bicarbonate solution which is further purged with carbon dioxide for 30 minutes and ammonia solution, pH 8.5 (titrated with 1M HCl), and then the immersion solution is manufactured.

FIG. 3, (e) depicted SEM and TEM image of NCNT vertical array on which calcium carbonate is coated, in which a column of calcium carbonate apparently formed on the surface of NCNT is appeared, the lattice of NCNT hidden by the lattice of calcium carbonate could be observed, and FIG. 4 (e) depicted SEM image of NCNT vertical array on which calcium carbonate is coated. The XRD pattern of NCNT for NCNT on which calcium carbonate is coated is depicted on FIG. 4. It could be identified that diffraction peaks of calcite lattices in XRD pattern are appeared at 29.4°, 35.9°, 39.4° 43.1° and 48.5° by resulting from calcites of (104), (110), (113), (202), (018) and (116), respectively. The broad peak at 43° is come from (103) of the graphitization structure of CNT. Figs exhibited EDX analysis results of NCNT vertical array on which calcium carbonate is coated, and FIG. 8, (b) exhibited the mechanism forming NCNT vertical array on which calcium carbonate is coated.

EXAMPLE 3

Gold-Nanostructure Composite

NCNT vertical array is manufactured on which gold is coated as the same method as in Example 1, except that Gold is coated on the surface of NCNT vertical array.

Figure 9A:
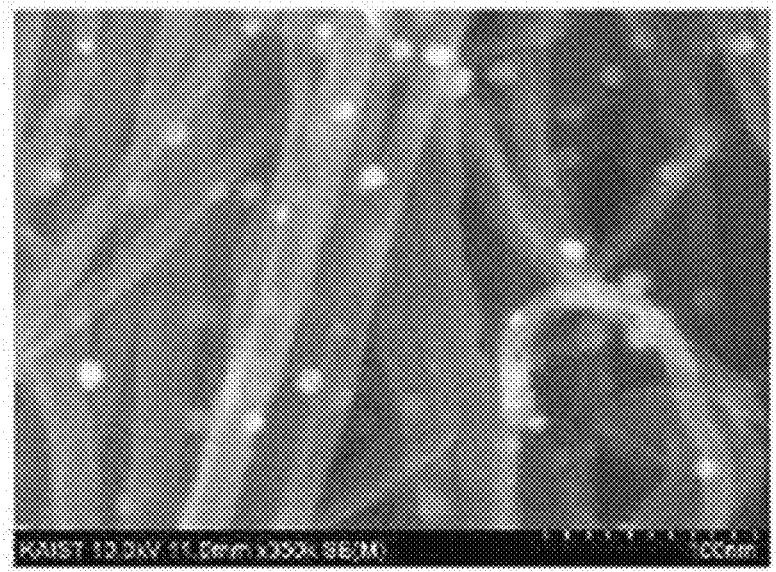
FIG. 9, (a) is a SEM image of NCNT coated with gold according to one example, and (b) is a TEM analysis photos.
Figure 9B:
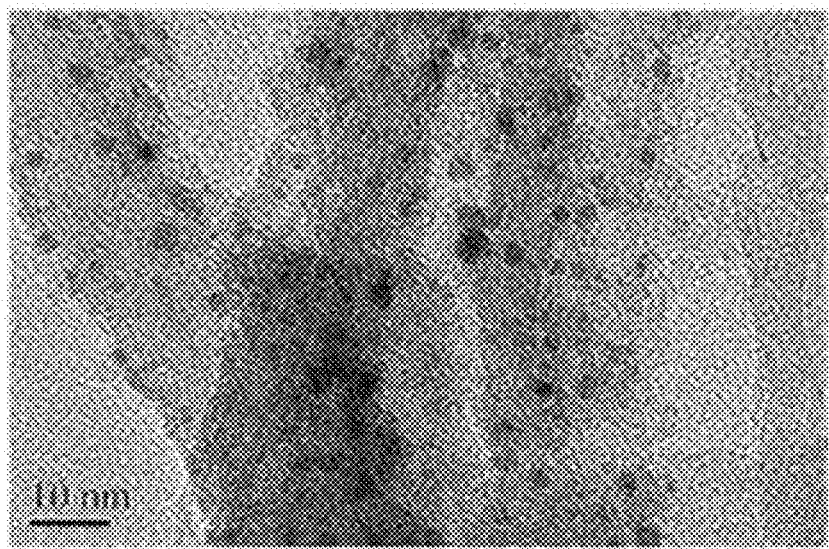
Figure 10A:
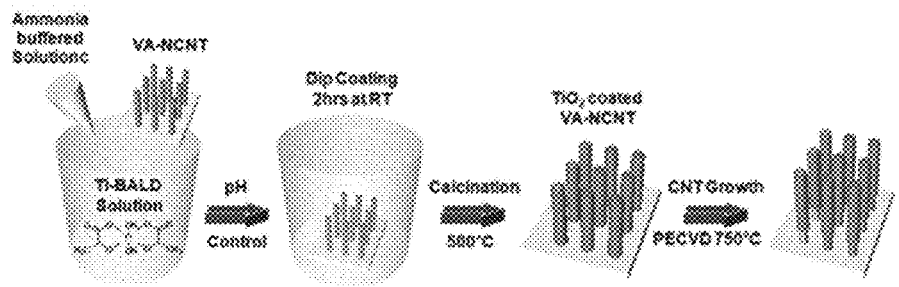
FIG. 10, (a) is a mechanism forming NCNT coated with titanium according to one example, (b) is a low magnification SEM photo, (c) is a high magnification TEM photo, (d) is a low magnification TEM image and, (d) is a high magnification TEM photo.
Figure 10B:
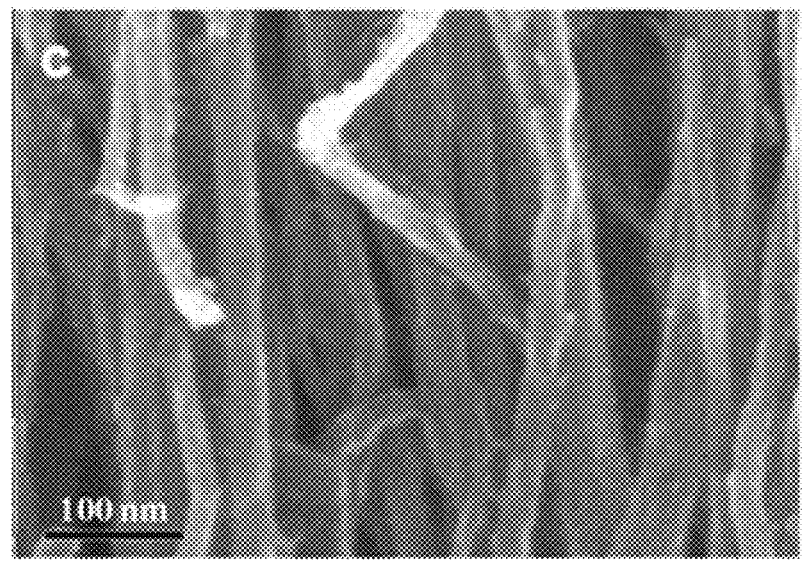
Figure 10C:
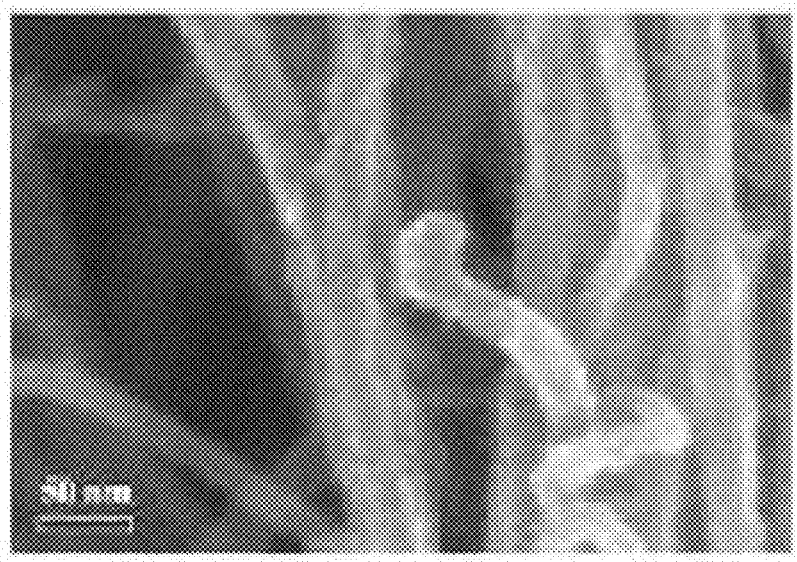
Figure 10D:
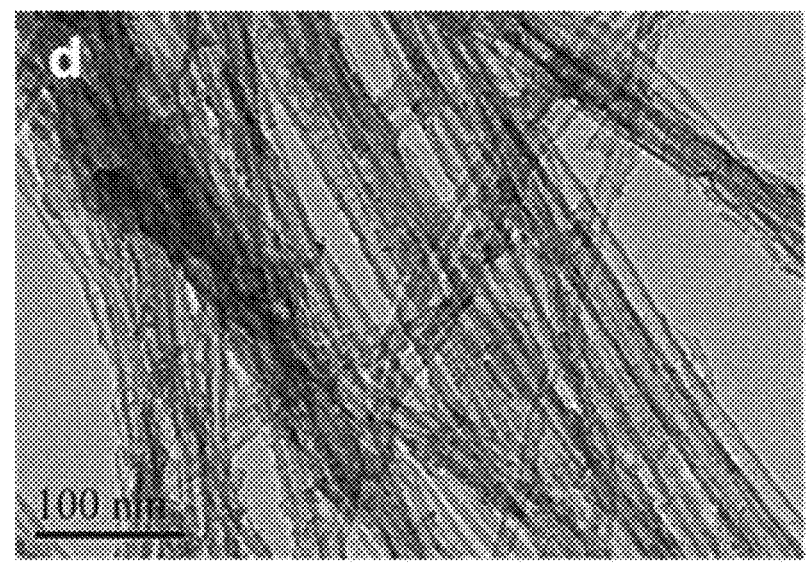
Figure 10E:
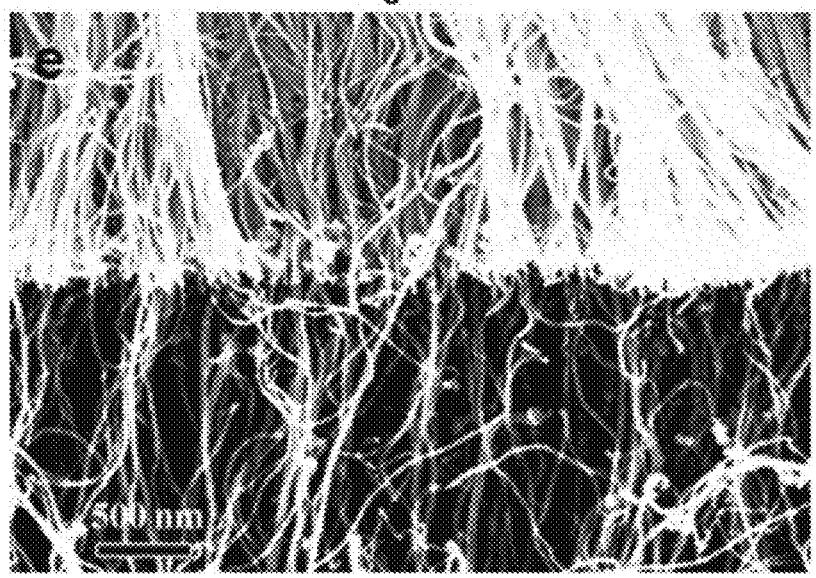

The present example made $HAuCl_4 3H_2O$ 1 g/Deionized Water (100 ml) (25.4 mM concentration) and then manufactured the immersion solution by mixing it with ammonia solution (pH 8.5) which is titrated by HCl. The SEM and TEM analysis results identifying NCNT on which gold is coated are depicted on FIG. 9.

EXAMPLE 4

Titanium-Nanostructure Composite

NCNT vertical array is manufactured on which titanium is coated as the same method as in Example 1, except that titanium is coated on the surface of NCNT vertical array.

The present example manufactured titanium precursor solution by mixing 3 ml of titanium (IV) bis (ammonium lactato)dihydroxide solution with 3 ml of ammonia solution (pH 8.5) which is titrated by HCl. The SEM and TEM analysis results identifying NCNT on which titanium is coated, and the mimetic diagram representing its formation procedure are depicted on FIG. 10.

EXAMPLE 5

Ruthenium Oxide-Nanostructure Composite

NCNT vertical array is manufactured on which ruthenium oxide is coated as the same method as in Example 1, except that ruthenium oxide is coated on the surface of NCNT vertical array.

Figure 11A:
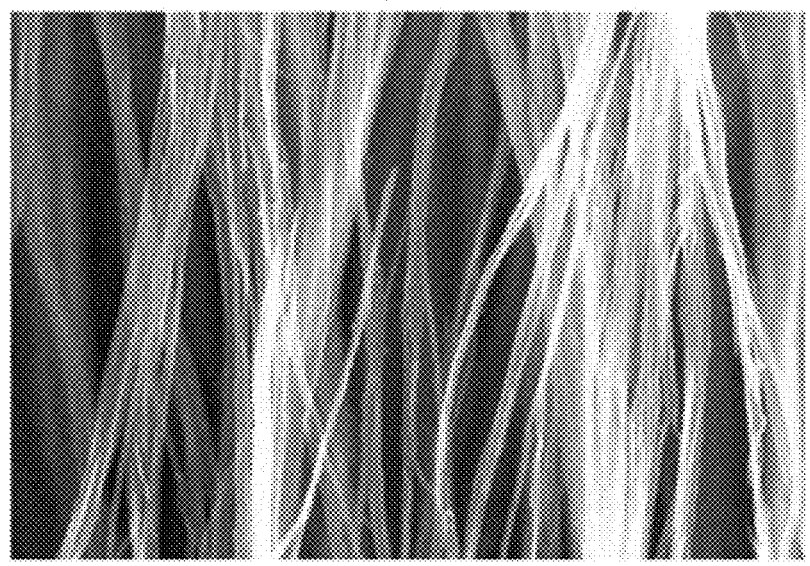
FIG. 11, (a) is a SEM image of NCNT coated with ruthenium oxide according to one example, (b) is a TEM analysis photo, (c) is a X-Ray Fluorescence Spectrometry (CRF) analysis result.
Figure 11B:
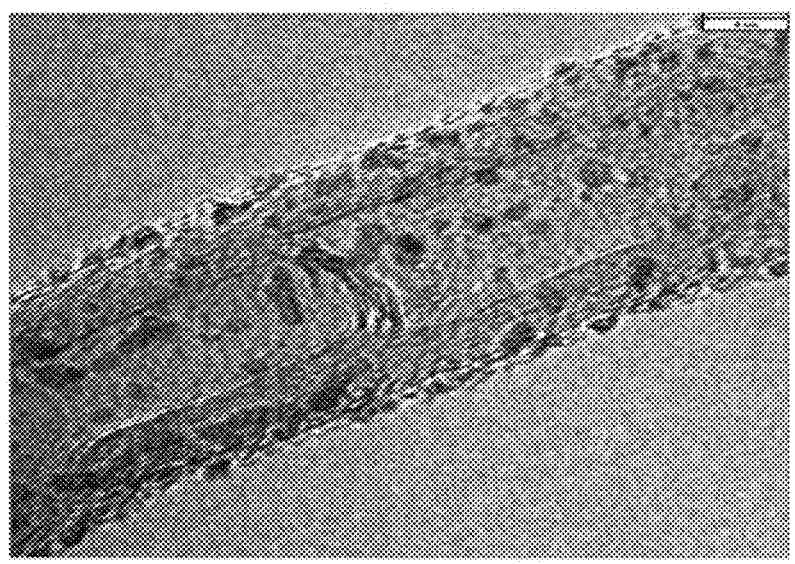
Figure 11C:
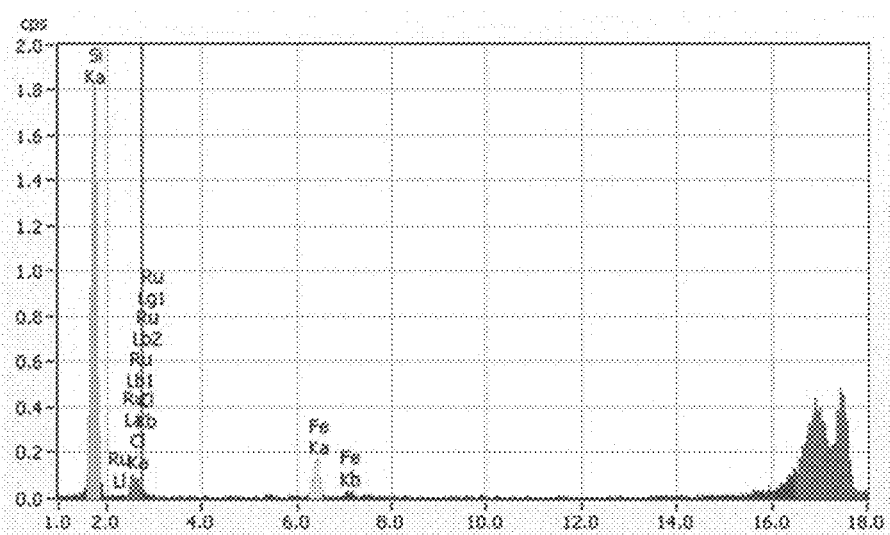

The present example manufactured a solution containing the inorganic material at 0.5M concentration by dissolving $RuCl_2$ in 6 ml of Ammonia solution (pH 8.5) which is titrated by HCl. The SEM, TEM and XRF analysis results identifying NCNT on which ruthenium oxide is coated are depicted on FIG. 11.

EXAMPLE 6

Zinc Oxide-Nanostructure Composite

NCNT vertical array is manufactured on which Zinc oxide is coated as the same method as in Example 1, except that zinc oxide is coated on the surface of NCNT vertical array.

Figure 12A:
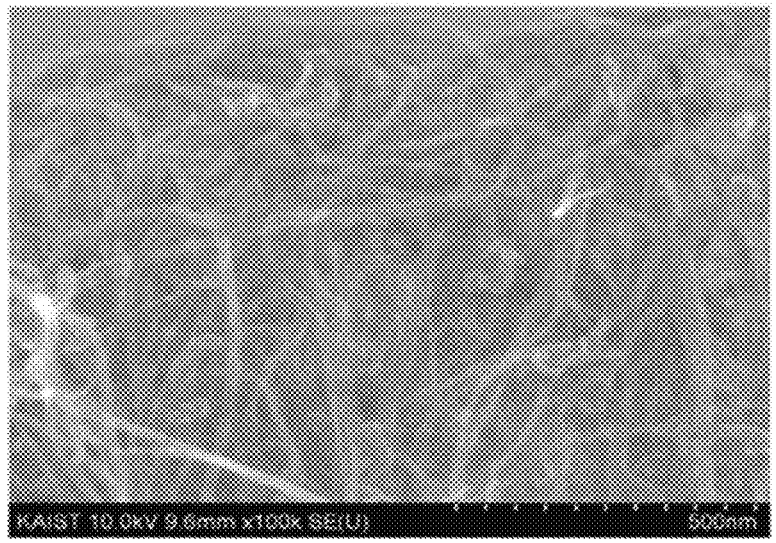
FIG. 12, (a) is a SEM analysis image coated with Zinc oxide according to one example, (b) is a TEM analysis photo, (c) graphically represents an Energy dispersive spectroscopy (EDS) analysis result.
Figure 12B:
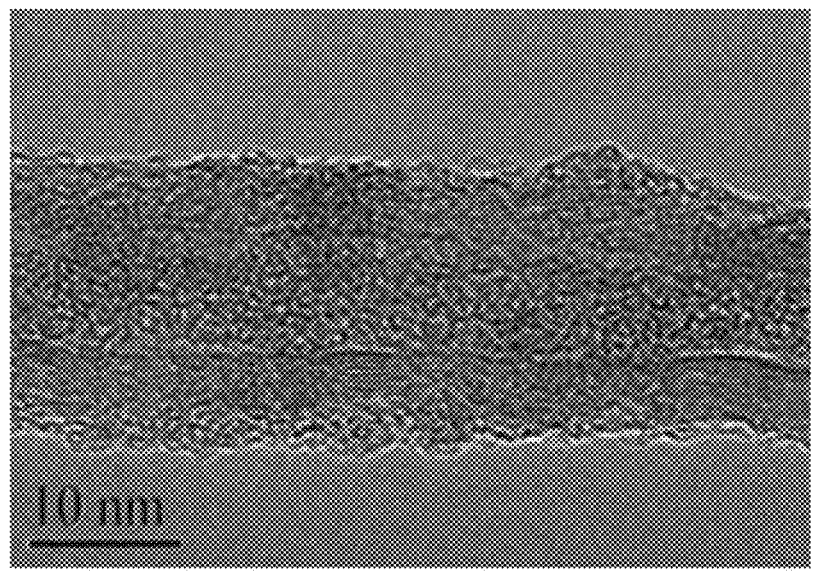

The present example made 0.1M solution by dissolving zinc acetate dehydrate in Deionized water (DI), and then manufactured the solution containing the inorganic material by mixing it with ammonia solution (pH 8.5) which is titrated by HCl. The SEM, TEM and EDS analysis results identifying NCNT on which zinc oxide is coated are depicted on FIG. 12.

EXAMPLE 7

Manganese Oxide-Nanostructure Composite

NCNT vertical array is manufactured on which Manganese oxide is coated as the same method as in Example 1, except that manganese oxide is coated on the surface of NCNT vertical array.

Figure 13A:
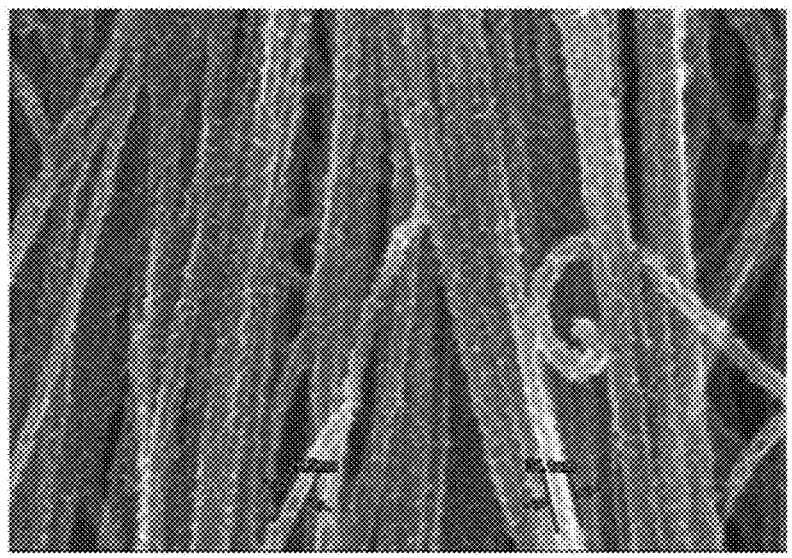
FIG. 13, (a) is a SEM image of NCNT coated with manganese oxide according to one example, (b) is a TEM analysis photo, and (c) graphically represents TEM-EDS analysis results.
Figure 13B:
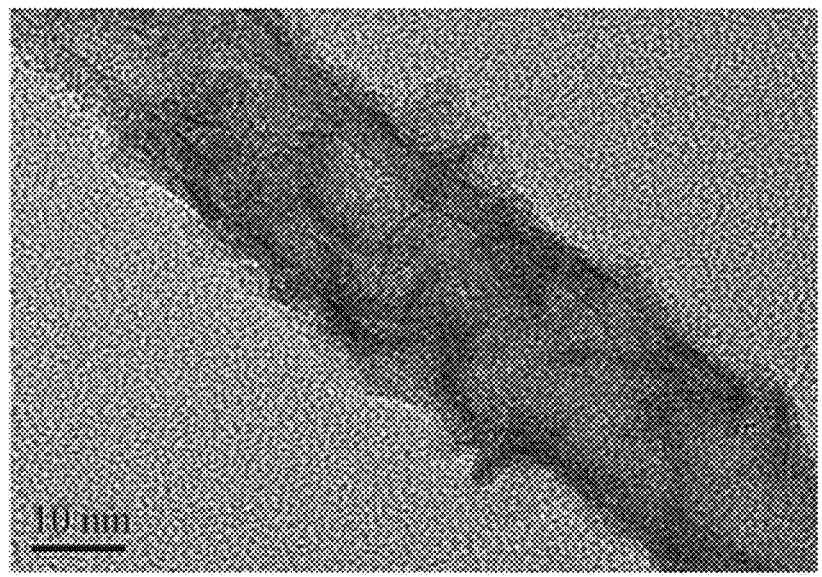
Figure 13C:
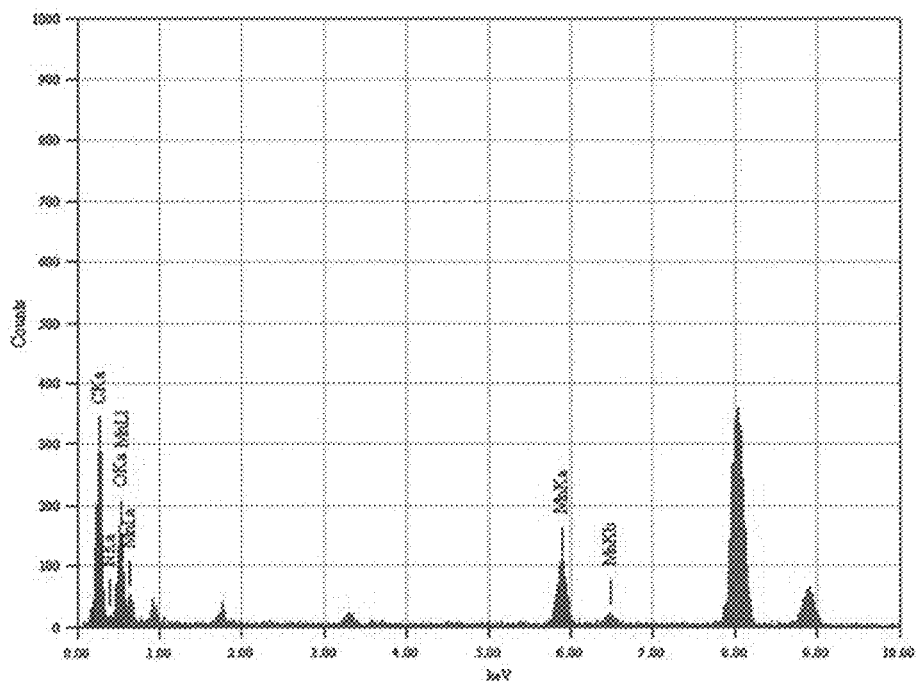

The present example manufactured the solution containing the inorganic material by dissolving potassium permanganate ($KMnO_4$) in DI. The SEM, TEM and TEM-EDS analysis results identifying NCNT on which manganese oxide is coated are depicted on FIG. 13.

COMPARISON EXAMPLE

CNT growth is performed on silicon oxide substrate on which Fe catalyst is vapor-deposited by PECVD method. Silicon oxide substrate is heated to 750° C. under the atmosphere flowing the mixing gas of hydrogen and argon, while maintaining the pressure of the mixing gas of 0.4 torr. The temperature of the heated substrate is slowly descended for the period of 3 minutes or less. After raising the pressure of chamber to 4.5 torr, DC plasma is activated by adding DC voltage of 540V to the ground connection substrate. The dense vertical CNT array grown from the catalyst array is manufactured by slowly flowing acetylene source gas at the flow rate of 5 sccm for 1 minute.

In the case of the immersion coating by using CNT, the reaction is progressed based on the physical absorption unlike NCNT case. In the case of the physical absorption, there is a drawback that materials on CNT surface can easily come off by various external fields, in the case of NCNT since it forms the direct bonding by using a covalent bonding and an ionic bonding with the nanomaterial, it can have stronger power to the external field. Further, in the case of NCNT, since it has a polarity due to the difference of electro negativity between carbon and nitrogen, it has the better hygroscopicity than that of CNT and then has more advantageous property in biomineral coating.

Now while the specific parts of the invention has been described in detail, it will be apparent to the ordinary person in the art that such specific description is merely the preferable practice embodiments, and the scope of the present invention is not restricted by it. Therefore, it should be that the substantial scope of the present invention is defined by the accompanying claims and their additives.

INDUSTRIAL APPLICABILITY

The carbon nanostructure according to the present invention is greatly improved in the conductivity and chemical reactivity, due to the inorganic material chemically bound to its surface when comparing the conventional carbon nanostructure, and in particular, Nitrogen-doping Carbon Nano-Tube (NCNT) vertical array on which the biomineral is coated according to one example of the present invention is useful for studying the synthesis of the bioinorganic material relevant to the biomimetic research.

What is claimed is:

1. A method for manufacturing a nanostructure composite, the method comprising:
    a step of doping pentavalent elements to a nanostructure and then forming doping points; and
    a step of growing a metal oxide from the doping points of the nanostructure by dipping the nanostructure having the doping points into a precursor solution of the metal oxide to be grown,
    wherein the step of the growth of the metal oxide is carried out at a room temperature.

2. The method for manufacturing a nanostructure composite according to claim 1, wherein the nanostructure is a carbon nanostructure.

3. The method for manufacturing a nanostructure composite according to claim 2, wherein the carbon nanostructure comprises a hexagonal graphite structure, and the doped pentavalent elements are substituted for carbon atoms of the graphite structure.

4. The method for manufacturing a nanostructure composite according to claim 3, wherein the carbon nanostructure is any one selected from the group consisting of carbon nanotube, carbon nanowire and graphene.

5. The method for manufacturing a nanostructure composite according to claim 1, wherein the metal oxide is selected from the group consisting of titanium oxide, ruthenium oxide, zinc oxide, manganese dioxide, and molybdenum oxide.

6. A method for manufacturing a carbon nanotube composite on which a metal oxide is coated, the method comprising:
    a step of doping a pentavalent elements to carbon nanotubes; and
    a step of coating the doped carbon nanotubes with the metal oxide,
    wherein the step of coating the metal oxide is progressed in such a manner that the carbon nanotubes on which the pentavalent elements are doped are dipped into a solution containing the metal oxide to be coated, and then maintained for the predetermined times.

7. The method for manufacturing a carbon nanotube composite according to claim 6, wherein the carbon nanotubes grow vertically from a substrate, and the method further comprising a step of hydrophilic-treating the carbon nanotubes so that the solution comprising the metal oxide is sufficiently penetrated between the nanotubes before the coating step.

8. The method for manufacturing a carbon nanotube composite according to claim 7, wherein the hydrophilic-treating step is progressed in such a manner that the carbon nanotubes are immersed into the hydrophilic solvent.

9. The method for manufacturing a carbon nanotube composite according to claim 7, further comprising a step of depositing a catalyst on the substrate and wherein the catalyst is selected from the group consisting of Fe, Ni and Cu.

10. The method for manufacturing a carbon nanotube composite according to claim 9, wherein the carbon nanotubes grow vertically by the method selected from the group consisting of plasma enhanced chemical vapor deposition, sputtering and, graphitizing of the polymer.

11. The method for manufacturing a carbon nanotube composite according to claim 6, wherein the metal oxide is selected from the group consisting of titanium oxide, ruthenium oxide, zinc oxide, manganese dioxide, and molybdenum oxide.

12. A method for manufacturing a nanostructure composite, the method comprising:
    a step of doping pentavalent elements to a nanostructure and then forming doping points; and
    a step of growing silica or calcium carbonate from the doping points of the nanostructure by clipping the nanostructure having the doping points into a precursor solution of silica or calcium carbonate to be grown,
    wherein the step of the growth of silica or calcium carbonate is carried out at a room temperature.

13. A method for manufacturing a carbon nanotube composite on which silica or calcium carbonate is coated, the method comprising:
    a step of doping a pentavalent elements to carbon nanotubes; and
    a step of coating the doped carbon nanotubes with silica or calcium carbonate,
    wherein the step of coating silica or calcium carbonate is progressed in such a manner that the carbon nanotubes on which the pentavalent elements are doped are dipped into a solution containing silica or calcium carbonate to be coated, and then maintained for the predetermined times.

* * * * *